United States Patent
Pozzi et al.

(10) Patent No.: US 9,776,722 B2
(45) Date of Patent: Oct. 3, 2017

(54) SEAT BACK PERSONAL ELECTRONIC DEVICE HOLDER

(71) Applicant: B/E AEROSPACE, INC., Wellington, FL (US)

(72) Inventors: Alexander Nicholas Pozzi, Winston-Salem, NC (US); Francis Xavier L. Garing, Atlanta, GA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/066,385

(22) Filed: Mar. 10, 2016

(65) Prior Publication Data

US 2016/0280376 A1  Sep. 29, 2016

Related U.S. Application Data

(60) Provisional application No. 62/137,465, filed on Mar. 24, 2015.

(51) Int. Cl.
*B64D 11/06* (2006.01)
*B64D 11/00* (2006.01)

(52) U.S. Cl.
CPC .............................. *B64D 11/00152* (2014.12)

(58) Field of Classification Search
CPC .............. B60N 2/206; B64D 11/00152; B64D 11/0015
USPC ....... 297/188.04, 188.05, 188.21, 217.3, 163
See application file for complete search history.

(56) References Cited

U.S. PATENT DOCUMENTS

| | | | | |
|---|---|---|---|---|
| 6,614,908 B1 * | 9/2003 | Huang | ................... | B60R 11/00 248/229.22 |
| 9,038,877 B2 * | 5/2015 | Bijlholt | ................... | B60R 11/02 224/553 |
| 9,290,271 B2 * | 3/2016 | Schurg | ................... | B64D 11/06 |
| 9,448,588 B2 * | 9/2016 | Barnard | ................ | G06F 1/1626 |

(Continued)

FOREIGN PATENT DOCUMENTS

| | | |
|---|---|---|
| DE | 29618476 U1 | 12/1996 |
| DE | 102012112942 A1 | 6/2014 |
| EP | 2746158 A1 | 6/2014 |

OTHER PUBLICATIONS

International Search Report and Written Opinion of corresponding International Apprication No. PCT/US2016/021754; dated May 24, 2016: 13 pages.

*Primary Examiner* — Philip Gabler
(74) *Attorney, Agent, or Firm* — Shumaker, Loop & Kendrick, LLP

(57) ABSTRACT

A personal electronic device holder for a seat back that includes a support housing positioned on an upper shroud portion of the seat back and an upper support for supporting the top edge of the electronic device positioned in the support housing. The upper support is mounted for movement between a lowered, stowed position in the support housing and a raised, deployed position extending out of and above the support housing. A lower support is provided for supporting the bottom edge of the electronic device, and is positioned for movement between a stowed position covering the support housing and a deployed, lower position below the support housing. The upper support and lower support have respective engaging surfaces defining between them a user-selected space for engaging and holding the top edge and bottom edge of the electronic device in a use position.

10 Claims, 9 Drawing Sheets

(56) References Cited

U.S. PATENT DOCUMENTS

| | | | |
|---|---|---|---|
| 9,457,905 B2* | 10/2016 | Felske | B64D 11/0627 |
| 9,511,862 B2* | 12/2016 | Thiele | B64D 11/06 |
| 2004/0145684 A1* | 7/2004 | Albert | B60N 2/4876 |
| | | | 348/837 |
| 2011/0278885 A1* | 11/2011 | Procter | B60R 11/0235 |
| | | | 297/135 |
| 2011/0316311 A1* | 12/2011 | Westerink | B60N 2/4876 |
| | | | 297/163 |
| 2012/0120626 A1* | 5/2012 | Akaike | B60R 11/02 |
| | | | 361/807 |
| 2012/0139303 A1* | 6/2012 | Westerink | B64D 11/0015 |
| | | | 297/163 |
| 2012/0248833 A1* | 10/2012 | Hontz | B60N 3/004 |
| | | | 297/188.05 |
| 2013/0037590 A1* | 2/2013 | Yoon | B60R 11/02 |
| | | | 224/483 |
| 2013/0147240 A1* | 6/2013 | Lee | B60N 2/22 |
| | | | 297/188.05 |
| 2013/0264298 A1* | 10/2013 | Shih | B64D 11/06 |
| | | | 211/26 |
| 2014/0009900 A1* | 1/2014 | Yeo | H04B 1/3888 |
| | | | 361/809 |
| 2014/0015289 A1* | 1/2014 | Fan | B60N 3/004 |
| | | | 297/188.05 |
| 2015/0108798 A1* | 4/2015 | Boyer, Jr. | B64D 11/0638 |
| | | | 297/163 |

* cited by examiner

SEAT BACK PERSONAL ELECTRONIC DEVICE HOLDER

CROSS-REFERENCE TO RELATED APPLICATIONS AND PRIORITY

The present application claims priority from U.S. Provisional Application No. 62/137,465, filed Mar. 24, 2015, the contents of which are hereby incorporated in the entirety.

TECHNICAL FIELD AND BACKGROUND OF THE INVENTION

This invention relates to a personal electronic device holder designed specifically for incorporation into a seat back area of a commercial passenger seat such as found on commercial aircraft. As used in this application, the term "electronic device" means handheld devices such as smart phones and tablets, but may include small laptops with foldable or removable keyboards. The device holder is integral to the upper seat back shroud and is adaptable to devices of different sizes.

Electronic devices are almost always in frequent use on commercial aircraft. Regulations now permit electronic devices smaller than laptops to be used in "airplane" mode during all phases of flight. Present seating does not provide for a convenient, hands-free way of positioning electronic devices for ease of use and viewing. Instead, the user simply holds the device in one or both hands or props the device at a viewing angle using the seat back table, a briefcase or other object supported on the lap. There exists a need for a simple and effective way of supporting an electronic device for use that permits quick and easy deployment and stowage and that does not interfere with other seating components.

SUMMARY OF THE INVENTION

It is therefore an object of the invention to provide a seat back personal electronic device holder that is adaptable to many different sizes and types of electronic devices.

It is another object of the invention to provide a personal electronic device holder that is designed for quick deployment and stowage.

It is another object of the invention to provide a personal electronic device holder that securely holds and positions the device at an optimal viewing angle that is maintained independent of the recline position of the seat back.

It is another object of the invention to provide a personal electronic device holder that includes a power source.

It is another object of the invention to provide a personal electronic device holder that is integrated into the upper seat back shroud.

It is another object of the invention to provide a personal electronic device holder that can be deployed and stowed with one hand.

It is another object of the invention to provide a personal electronic device holder that permits use of the seat back tray table independent of the device holder.

These and other objects and advantages of the present invention are achieved in the preferred embodiment disclosed below by providing a personal electronic device holder for a seat back that includes a support housing positioned on an upper shroud portion of the seat back and an upper support positioned in the support housing, mounted for movement between a lowered, stowed position in the support housing and a raised, deployed position extending out of and above the support housing. A lower support is positioned for movement between a stowed position proximate the support housing and a deployed, lower position. The upper support and lower support has respective engaging elements defining between them a user-determined space for engaging and holding a respective top edge and bottom edge of the electronic device in a use position.

In accordance with another embodiment of the invention, the lower support includes a hinged cover which is positioned over the support housing when in the stowed position. and the engaging element of the lower support includes a top edge of the lower support adapted for supporting a relatively large size electronic device. A laterally-extending raised strip is positioned on an inner surface of the lower support at a position closer to the top edge of the lower support and adapted for supporting a relatively small size electronic device.

In accordance with another embodiment of the invention, the upper support is mounted for sliding movement vertically upwardly from the stowed position in the support housing into the user-determined use position, and the upper support includes an outwardly projecting lip for supporting the top edge of the electronic device.

In accordance with another embodiment of the invention, the lip of the upper support when in the lower, stowed position is positioned adjacent a top edge of the lower support.

In accordance with another embodiment of the invention, the lip of the upper support when in the lower, stowed position is positioned adjacent in a recess in a top edge of the lower support for being manually accessed to raise the lower support into the use position.

In accordance with another embodiment of the invention, a latch is positioned in the support housing for maintaining the lower support in the stowed position against the support housing and for cooperating with the lip of the upper support to release the lower support from the stowed position when the upper support is raised from its stowed position into the deployed use position.

In accordance with another embodiment of the invention, a latch is positioned in the support housing for maintaining both the upper support and the lower support in respective stowed positions against the support housing, and for cooperating with the lip of the upper support to release the lower support from the stowed position when the upper support is raised from the stowed position into the deployed use position.

In accordance with another embodiment of the invention, a personal electronic device holder for a seat back is provided that includes a support housing positioned on an upper shroud portion of the seat back and an upper support positioned in the support housing, mounted for movement between a lowered, stowed position in the support housing and a raised, deployed position extending out of and above the support housing. The upper support includes a panel for sliding movement vertically upwardly from the stowed position in the support housing into a user-determined position, and an outwardly projecting lip for supporting a top edge of the electronic device. A lower support is positioned for movement between the stowed position covering the support housing and the deployed, lower position below the support housing and comprising a hinged cover and the engaging element of the lower support comprises a laterally-extending raised strip. The deployed upper support and the deployed lower support has respective engaging elements defining between them a user-determined space for engaging and holding a respective top edge and bottom edge of the electronic device in a use position.

In accordance with another embodiment of the invention, the lower support includes a hinged cover, and the engaging elements of the lower support include a top edge of the hinged cover adapted for supporting a relatively large size electronic device. A laterally-extending raised strip is positioned on an inner surface of the hinged cover at a position closer to the top edge of the hinged cover and is adapted for supporting a relatively small size electronic device.

In accordance with another embodiment of the invention, the lip of the upper support in the lower, stowed position is positioned adjacent in a recess in a top edge of the lower support for being manually accessed for raising the lower support into the use position.

In accordance with another embodiment of the invention, a personal electronic device holder for a seat back is provided that includes a support housing positioned on an upper shroud portion of the seat back. An upper support is positioned in the support housing, mounted for movement between a lowered, stowed position in the support housing and a raised, deployed position extending out of and above the support housing. The upper support includes a panel for sliding movement vertically upwardly from the stowed position in the support housing into a user-determined position, and an outwardly projecting lip for supporting a top edge of an electronic device. A lower support is positioned for movement between a stowed position covering the support housing and a deployed, lower position below the support housing and includes a hinged cover. The upper support and lower support have respective engaging elements defining between them a user-determined space for engaging and holding a respective top edge and bottom edge of the electronic device in the use-determined position.

In accordance with another embodiment of the invention, a recess is provided in the top edge of the lower support for allowing manual access to the lip of the upper support.

In accordance with another embodiment of the invention, a power port is positioned on the seat back shroud proximate the lower support for allowing the user to charge the electronic device.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 3:
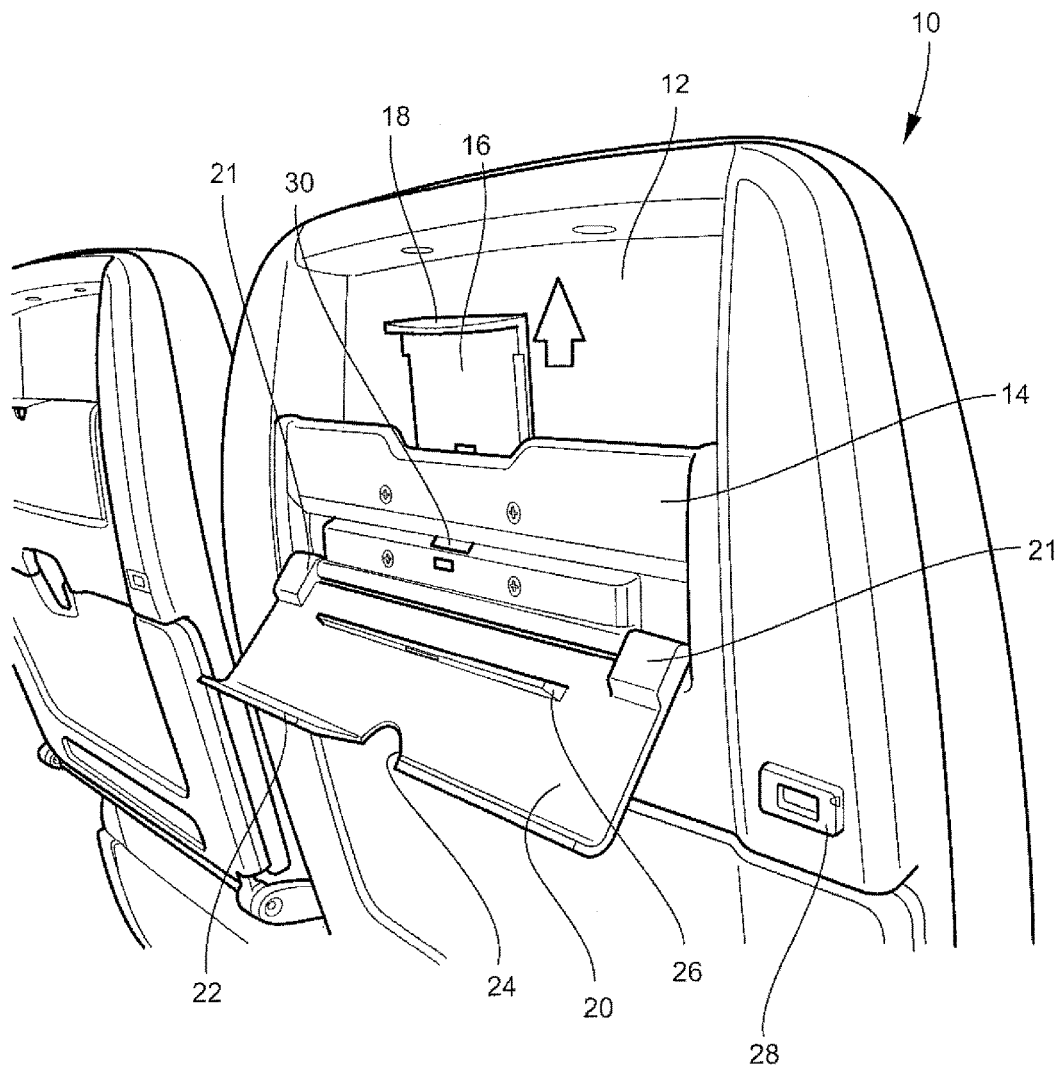
FIG. 3 is a view of the personal electronic device holder of FIG. 1 showing the lower support deployed and the upper support in the process of being deployed for use.
Figure 4:
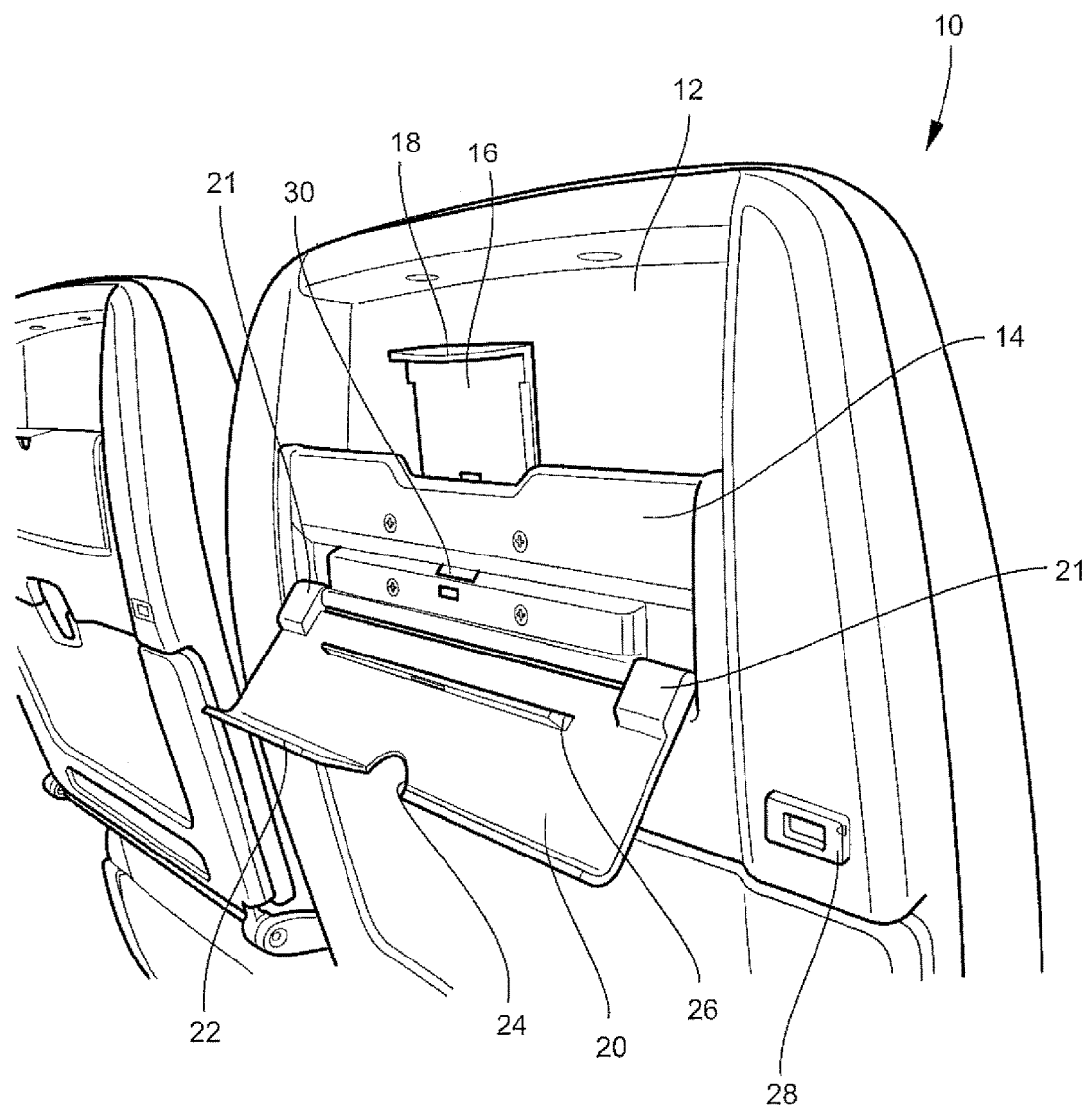
FIG. 4 is a view of the personal electronic device holder of FIG. 1 deployed for use.
Figure 5:
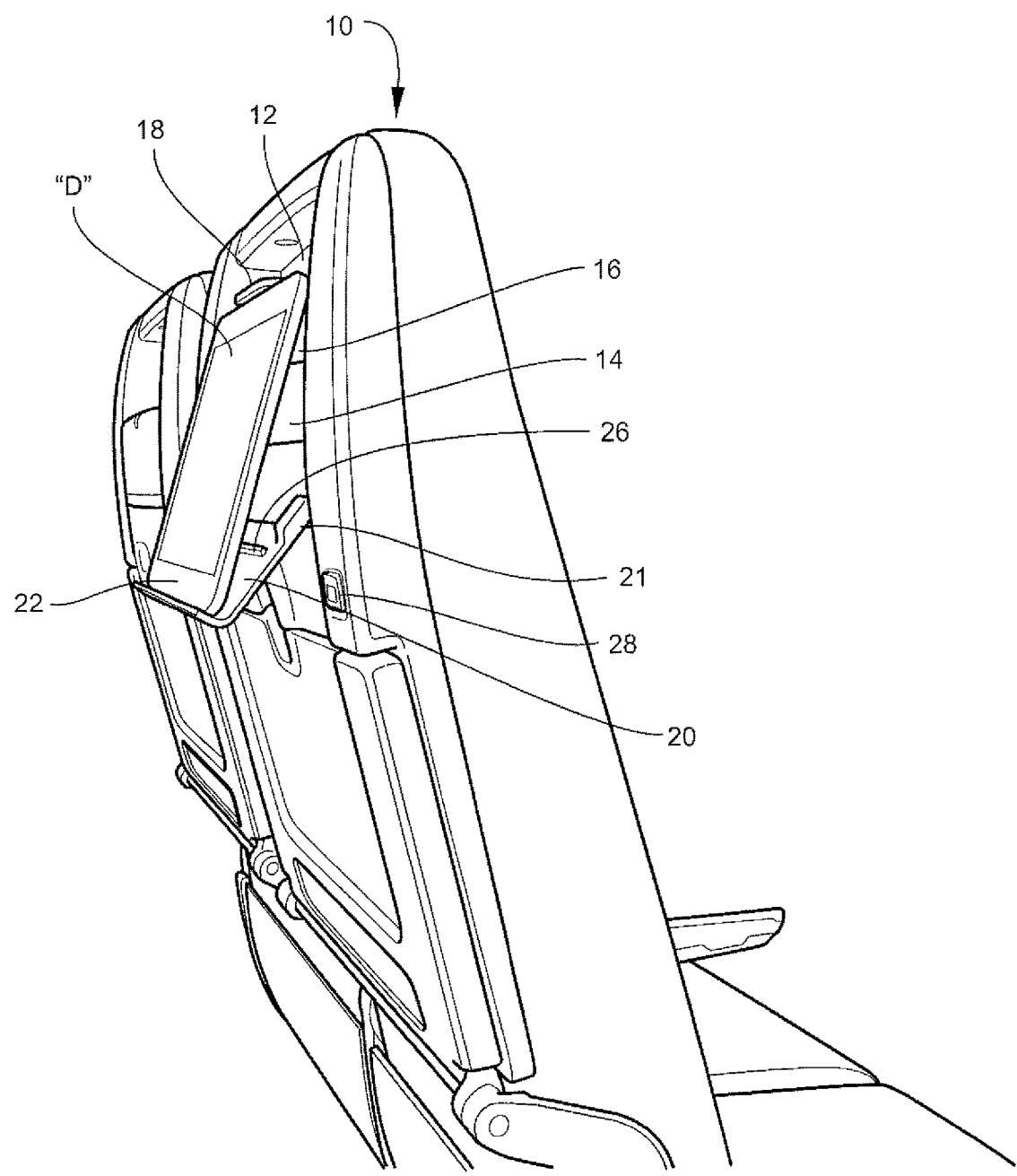
FIG. 5 is an oblique side perspective view showing a tablet-sized device positioned in the holder.
Figure 6:
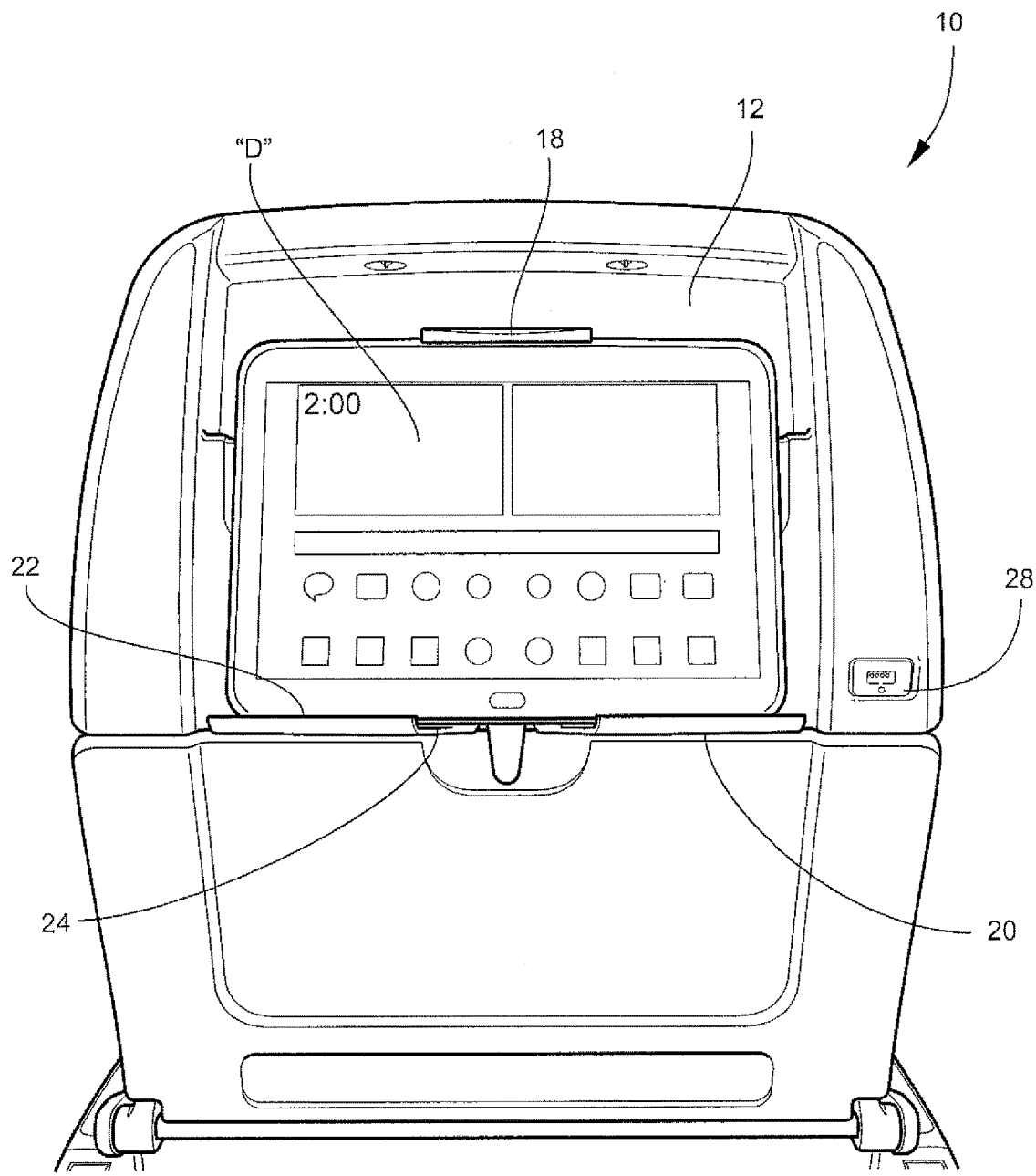
FIG. 6 is a rear elevation of the electronic device holder deployed with a tablet-sized device positioned in the holder.
Figure 7:
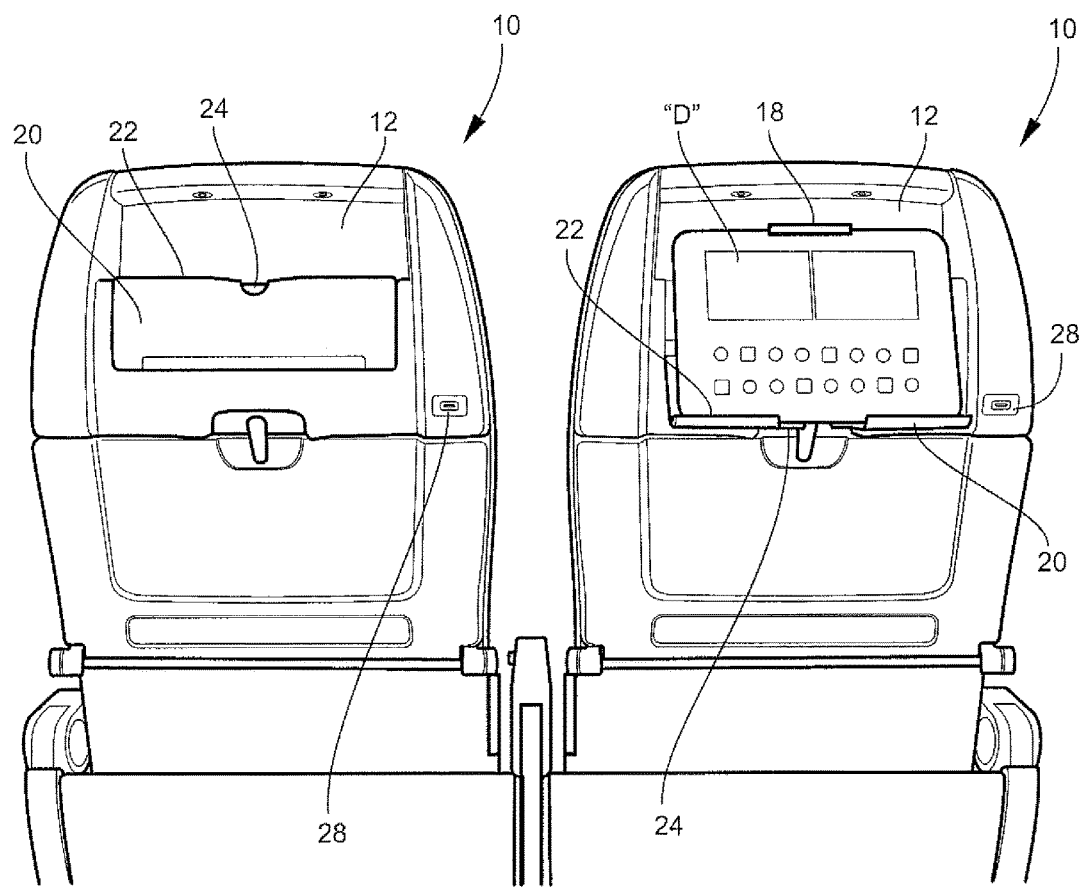
FIG. 7 is a rear elevation of a pair of seat backs, showing the left hand holder in a stowed position and the right hand holder in a deployed position holding a tablet-sized device.

Referring now specifically to FIGS. 1-9 of the drawings, a personal electronic device holder 10 is shown as part of a seat back shroud 12. A support housing 14 extends laterally across the seat back shroud 12 and houses an upper support 16 that is mounted for sliding movement vertically upward from the support housing 14 for deployment and use, and for sliding movement vertically downward into the support housing 14 for stowage when not in use. The upper support 16 includes a lip 18 that extends outwardly for supporting the top edge of a device "D" being held in the holder 10, as shown in FIGS. 5, 6 and 7.

The holder 10 also includes a lower support 20 that is mounted on hinges 21 and is deployed by pivoting the lower support 20 downwardly and away from the seat back shroud 12. The lower support 20 has an inwardly-curved top edge 22 that fits against the seat back shroud 12 when stowed, and serves as a lower lip when deployed to support the lower edge of a device "D" being held in the holder 10. See FIG. 5. When stowed, the upper support 16 locks the lower support 20 in the stowed position, and when the upper support 16 is raised, the lower support 20 is automatically released for deployment into its terminal position. The upper support 16 is preferably spring-loaded and when released returns to its stowed position.

The lower support also includes a recess 24 for allowing a finger to be used to pull the lower support 20 into the deployed position. As best shown in, for example, FIGS. 2, 3 and 4, a raised support strip 26 extends laterally across the inner side of the lower support 20 and provides support for the lower edge of a relatively small electronic device "D". Such a relatively small electronic device "D" would be supported between the lip 18 of the upper support 16 and the strip 26.

Figure 1:
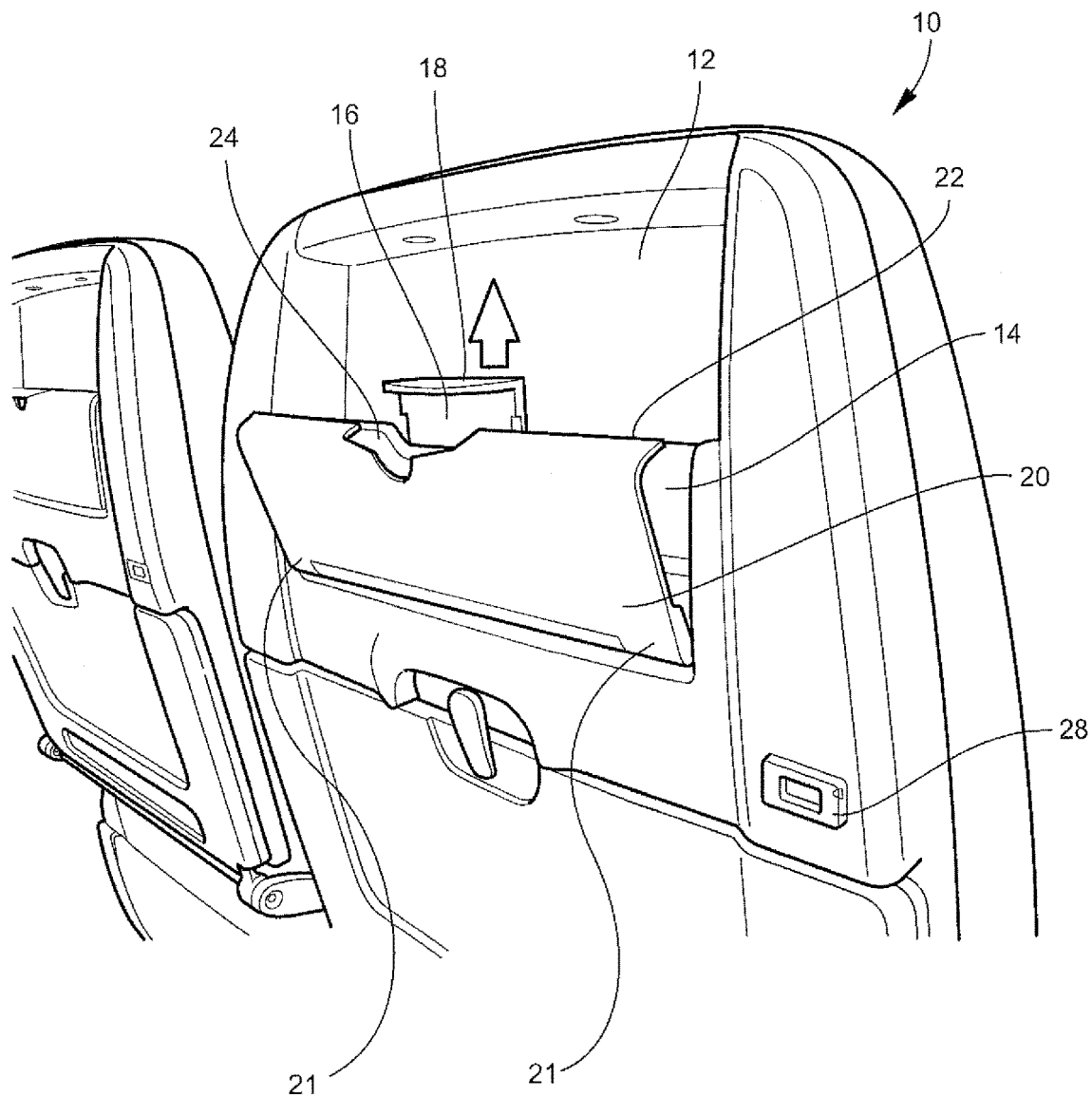
FIG. 1 is a perspective view of a passenger seat back showing the personal electronic device holder according to a preferred embodiment of the invention positioned in the upper seat back shroud.

The holder 10 also includes a power supply outlet, such as a USB power port 28. A two way stowage latch 30 locks both the upper support 16 and lower support 20 in place when in the stowage position. The latch 30 may be powered by a spring (not shown) that is compressed when the upper support 16 is in the stowed position of FIGS. 8 and 9 and which urges the upper support 26 upward into the deployed position of, for example, FIGS. 1 and 2 when released. Alternatively, the upper support 16 may be stowed and deployed by manually raising or depressing the upper support 16 sufficiently to overcome a predetermined amount of friction between the upper support 16 and the slot in which it is housed, as shown in FIG. 1. Other known means of powering the stowage and deployment of the upper support 16 are also contemplated and are within the scope of this application.

Figure 2:
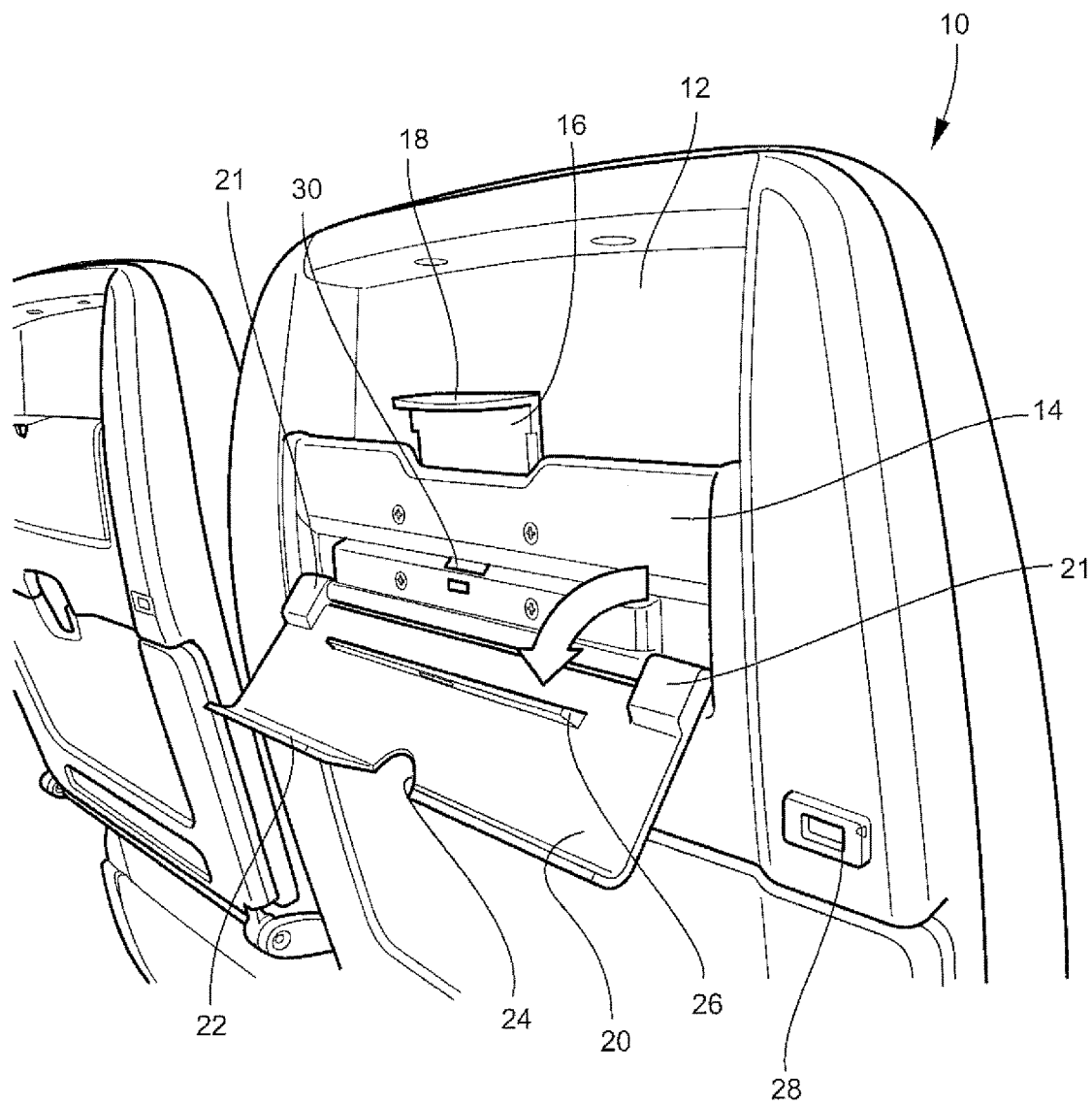
FIG. 2 is a view of the personal electronic device holder of FIG. 1 showing the lower support in the process of being deployed for use.

Shown in sequence of operation, FIG. 1 shows the upper support 16 being deployed by raising it out of its stowed position in the support housing 14. Deploying the upper support 16 automatically releases the two-way stowage latch 30 and deploys the lower support 20, as is pivots downwardly on its hinges 21, as shown in FIG. 2. FIGS. 3 and 4 illustrate that after both the upper support 16 and lower support 20 have been deployed, the upper support 16 is raised to the level necessary to secure the device "D".

FIGS. 5, 6 and 7 show a large tablet-type electronic device positioned in the holder 10, with its top edge supported by the lip 18 of the upper support 16, and its bottom edge supported by the top edge 22 of the lower support 20. While not shown explicitly, it is understood that a smart phone or smaller-sized tablet can be held by supporting the top edge with the lip 18 of the upper support 16 and its bottom edge with the raised support strip 26 on the inner side of the lower support 20.

Figure 8:
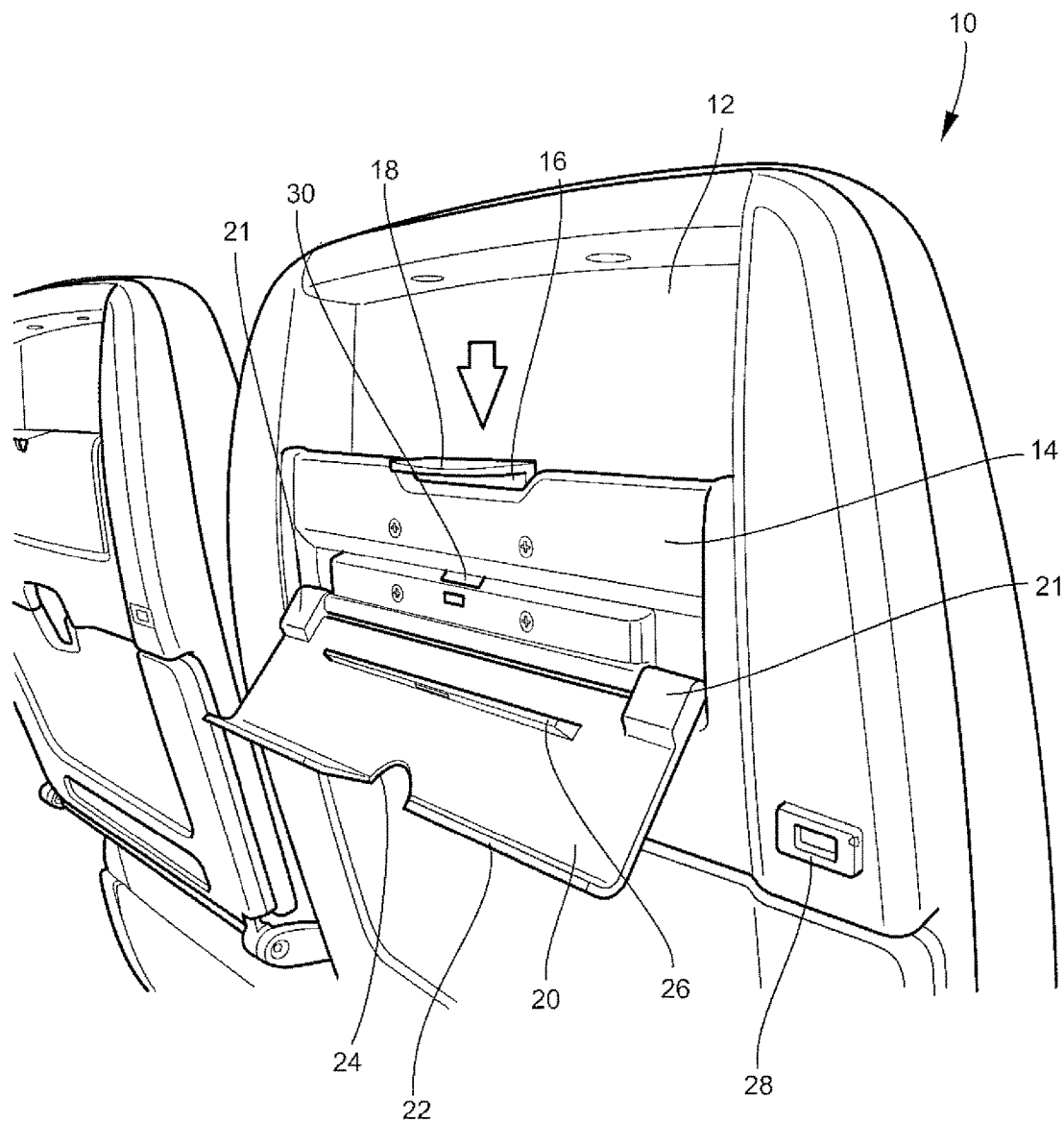
FIG. 8 shows the upper support of the holder being stowed.
Figure 9:
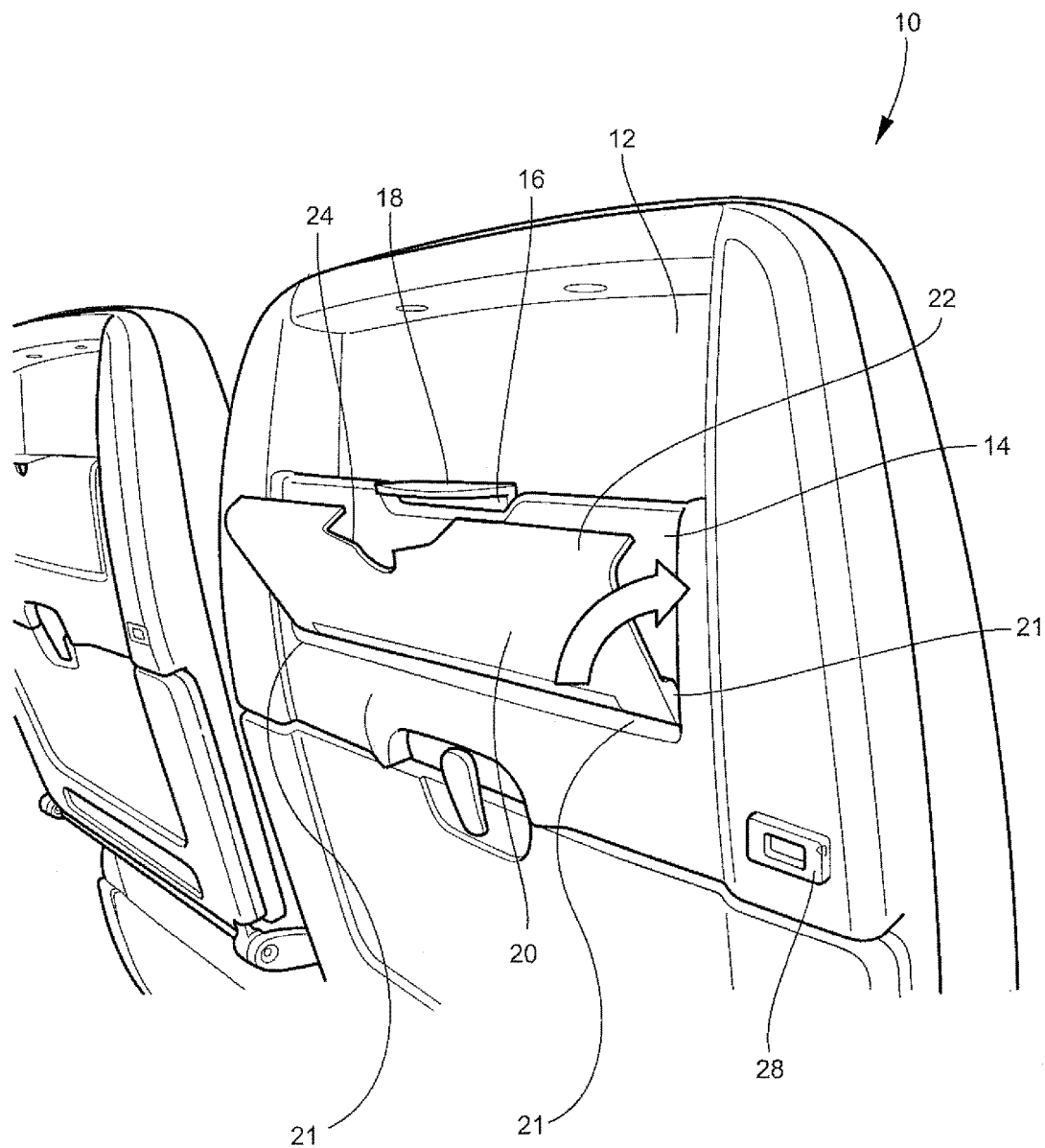
FIG. 9 shows the lower support of the holder being stowed after the upper support has been stowed.

To stow the holder 10, the upper support 16 is released and a spring, not shown, retracts the upper support 16 into the support housing 14, as shown in FIG. 8. Rotating the lower support 20 into its stowed position, as shown in FIG. 9, latches both the upper support 16 and lower support 20 in the fully stowed position shown on the left hand seat of FIG. 7.

A personal electronic device holder is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A personal electronic device holder for a seat back, comprising:
   a support housing positioned on an upper shroud portion of the seat back;
   an upper support positioned in the support housing, mounted for movement between a lowered, stowed position in the support housing and a raised, deployed position extending out of and above the support housing, wherein the upper support includes an engaging element comprising an outwardly projecting lip for supporting a top edge of an electronic device; and
   a lower support positioned for movement between a stowed position proximate the support housing and a deployed, lower position, wherein the lower support includes an engaging element for supporting a bottom edge of the electronic device;
   wherein the respective engaging elements of the upper support and the lower support define between them a user-determined space for engaging and holding the electronic device in a use position;
   and wherein the outwardly projecting lip of the upper support when in the lower, stowed position is positioned adjacent a recess in a top edge of the lower support for being manually accessed to raise the lower support into the use position.

2. The personal electronic device holder according to claim 1, wherein:
   the lower support comprises a hinged cover which is positioned over the support housing when in the stowed position;
   the engaging element of the lower support comprises a top edge of the lower support adapted for supporting a tablet-sized electronic device; and
   the lower support comprises a second engaging element comprising a laterally-extending raised strip positioned on an inner surface of the lower support and adapted for supporting a smart phone-sized size electronic device.

3. The personal electronic device holder according to claim 1, wherein the upper support is mounted for sliding movement vertically upwardly from the stowed position in the support housing into the use position, wherein the use position comprises one of a plurality of user-selectable vertical positions.

4. The personal electronic device holder according to claim 1, wherein the support housing comprises a latch positioned in the support housing for maintaining the lower support in the stowed position against the support housing.

5. The personal electronic device holder according to claim 1, wherein the support housing comprises a latch positioned in the support housing for maintaining both the upper support and the lower support in respective stowed positions against the support housing.

6. A personal electronic device holder for a seat back, comprising:
   a support housing positioned on an upper shroud portion of the seat back;
   an upper support positioned in the support housing, mounted for movement between a lowered, stowed position in the support housing and a raised, deployed position extending out of and above the support housing, the upper support comprising
      a panel for sliding movement vertically upwardly from the lowered, stowed position in the support housing into the raised, deployed position, and
      at least one engaging element for engaging and holding a top edge of an electronic device, wherein the at least one engaging element comprises an outwardly projecting lip for supporting a top edge of the electronic device; and
   a lower support positioned for movement between the stowed position covering the support housing and a deployed, lower position below the support housing, the lower support comprising
      a hinged cover, and
      at least one engaging element for engaging and holding a bottom edge of the electronic device, wherein the at least one engaging element of the lower support comprises a laterally-extending raised strip;
   wherein the respective engaging elements of the upper support and the lower support, upon mutual deployment of the upper support and lower support in a user-determined position, define between them a user-determined space for engaging and holding the electronic device in a use position; and wherein the outwardly projecting lip of the upper support when in the lower, stowed position is positioned adjacent a recess in a top edge of the lower support for being manually accessed to raise the lower support into the use position.

7. The personal electronic device holder according to claim 6, wherein the at least one engaging element of the lower support comprises a top edge of the hinged cover adapted for supporting a tablet-sized electronic device, wherein the laterally-extending raised strip is positioned on an inner surface of the hinged cover and adapted for supporting a smart phone-sized electronic device.

8. The personal electronic device holder according to claim 6, wherein the lip of the upper support in the lower, stowed position is positioned adjacent a recess in a top edge of the lower support for being manually accessed for raising the lower support into the use position.

9. A passenger seat comprising a seat back personal electronic device holder, the passenger seat comprising:
   a seat back shroud covering at least a portion of the seat back; and
   a personal electronic device holder, comprising
      a support housing positioned on an upper shroud portion of the seat back,
      an upper support positioned in the support housing, mounted for movement between a lowered, stowed position in the support housing and a raised, deployed position extending out of and above the support housing, the upper support comprising a panel for sliding movement vertically upwardly from the stowed position in the support housing into a user-determined position, and an engaging element comprising an outwardly projecting lip for supporting a top edge of an electronic device, a lower support positioned for movement between a stowed position covering the support housing and a deployed, lower position below the support housing, the lower support comprising a hinged cover, and an engaging element comprising a laterally-extending raised strip for supporting a bottom edge of the electronic device, wherein the respective engaging elements of the upper support and the lower support define between them a user-determined space for engaging and holding the electronic device in the user-determined position and wherein the lower support comprises a recess in a top edge of the lower support for allowing manual access to the lip of the upper support.

10. The passenger seat according to claim 9, further comprising a power port positioned on the seat back shroud proximate the lower support for allowing the user to charge the electronic device.

* * * * *